United States Patent [19]
Clingempeel

[11] Patent Number: 5,895,731
[45] Date of Patent: Apr. 20, 1999

[54] THIN-FILM LITHIUM BATTERY AND PROCESS

[75] Inventor: Richard K. Clingempeel, Lanexa, Va.

[73] Assignee: Nelson E. Smith, White Marsh, Va.

[21] Appl. No.: 08/856,658

[22] Filed: May 15, 1997

[51] Int. Cl.$^6$ ............... H01M 2/04; H01M 6/22; H01M 10/40
[52] U.S. Cl. ............... 429/162; 429/82; 429/234; 429/245; 429/303; 29/623.2; 29/623.4
[58] Field of Search ............... 429/82, 162, 176, 429/190, 198, 234, 245; 29/623.2, 623.4

[56] References Cited

U.S. PATENT DOCUMENTS

| | | | |
|---|---|---|---|
| 3,985,574 | 10/1976 | Feuillade et al. | 429/162 |
| 5,004,655 | 4/1991 | Symanski | 429/82 |
| 5,578,399 | 11/1996 | Olsen | 429/245 |
| 5,652,072 | 7/1997 | Lamanna et al. | 429/198 |
| 5,750,289 | 5/1998 | Kejha | 429/245 X |

*Primary Examiner*—Stephen Kalafut
*Attorney, Agent, or Firm*—Wallace J. Nelson

[57] ABSTRACT

A lithium battery and process of making same involves employing alternate layers of a lithium anode and an aluminum foil or NiAl expanded metal supported cathode assembly with a gel electrolyte contacting the alternate layers. The electrolyte includes a quantity of N-methyl-2-pyrrollidone and lithium contained within a polyimide matrix and the entire assembly is contained within a sealed polyimide casing. Separate electrical contacts are provided for each of the lithium anode assembly and the aluminum foil or NiAl supported cathode assembly. An out-gassing vent tube extends from the sealed polyimide casing and is sealed a predetermined time after battery construction.

16 Claims, 12 Drawing Sheets

10 – Assembled Lithium Battery
11 – Lithium Battery w/o Casing
12 – Exterior Casing
13 – Cathode (A)
14 – Cathode (B)
15 – Anode 11 – Lithium Battery w/o Casin
12 – Exterior Casing
13 – Cathode (A)
14 – Cathode (B)
15 – Anode
22 – 24 Hr. Vent Tube 40 – Cathode Material
42 – Fiberglass Matting
43 – Aluminum Foil
43a – Kapton Film
48 – Clear Acetate Film
49 – Clear Acetate Film

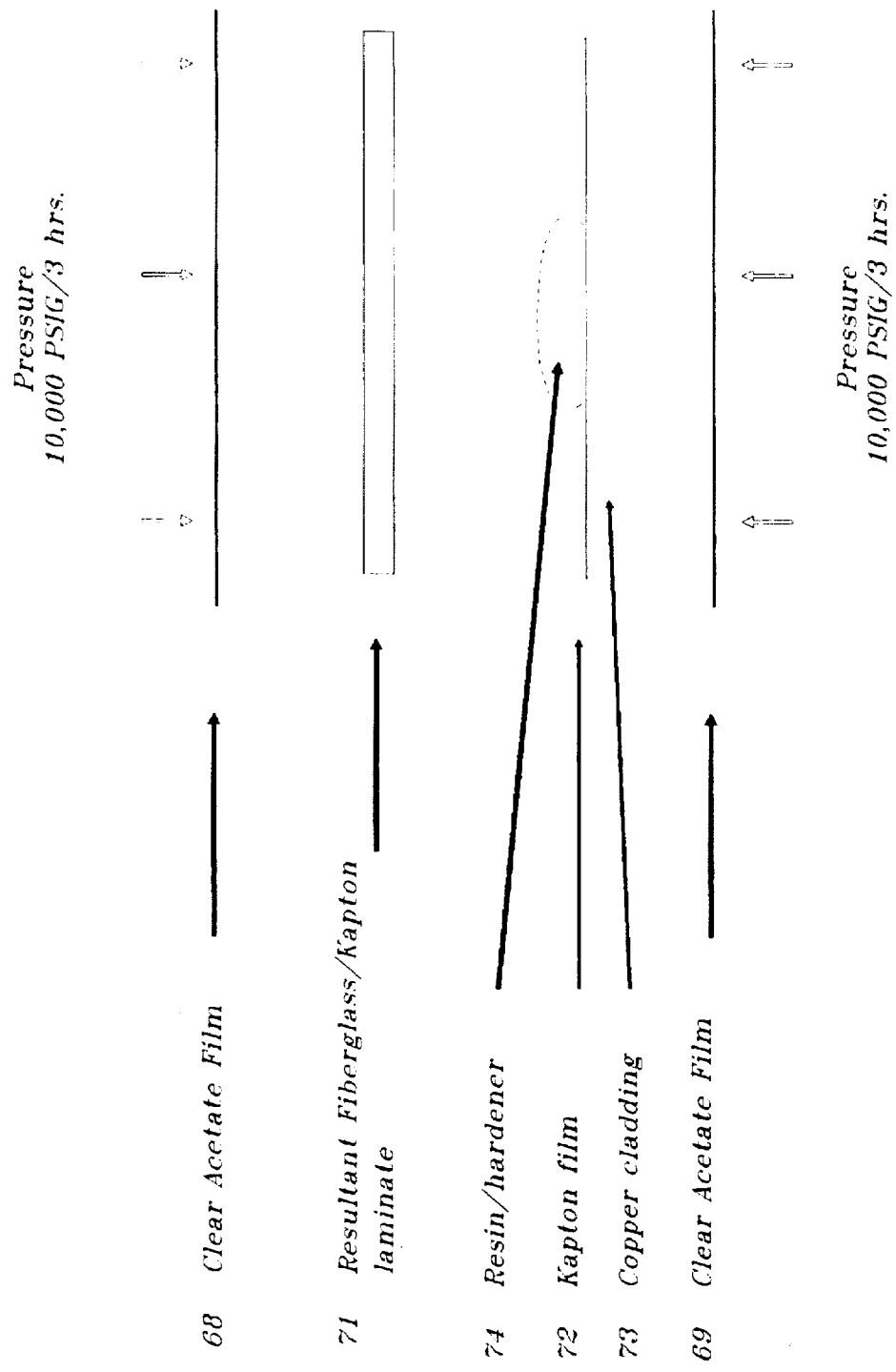

THIN-FILM LITHIUM BATTERY AND PROCESS

FIELD OF THE INVENTION

This invention relates generally to batteries and relates specifically to small, thin film, lithium batteries and the process for making same.

BACKGROUND OF THE INVENTION

Small, high energy-density, low voltage batteries are in great demand in the computer technology age in which we live. Many types of nickel-cadmium (Ni-Cd) and nickel-metal-hydride (NiMH) batteries are popular in personal computers, and other electronics, but the price excludes use of these battery types in low-cost products.

Ni-Cd rechargeable and amorphous (flexible, changing) solar batteries are also used extensively but the cost of these batteries is also of concern. Lithium-ion cells have also been produced that have twice the density of Ni-Cd batteries but are also expensive to make. There is a definite need in the art for an improved, economically mass-produced, rechargeable battery that has improved energy-density (energy per unit volume), output voltage, reversibility (ability to take a charge, and to be recharged), reliability, safety and cost properties.

It is therefore an object of the present invention to provide an improved, economical, high energy-density, low-voltage, composite lithium metal/lithium-ion battery.

Another object of the present invention is to provide a lithium battery that is adaptable for mass production and reliable in operation.

An additional object of the present invention is to provide a lithium battery that has significantly improved reversibility (rechargability) and safety characteristics compared to that of prior art lithium batteries.

A further object of the present invention is a novel process for economically making lithium batteries.

SUMMARY OF THE INVENTION

According to the present invention, the foregoing and additional objects are attained by providing alternate layers of a lithium foil anode assembly and an aluminum foil or an expanded metal nickel-aluminum (NiAl) cathode conductor supporting the cathode material, disposed in alternate layers and, containing a lithium-polyimide matrix dissolved in N-methyl-2-pyrrollidone (NMP), or similar ionic solvent such as toluene. The term "expanded metal" refers to a metal designed and constructed to present the maximum 3-D conductive surface area to reactants when pulled open or expanded.

The layered anode-composite-cathode structure is encased and sealed in a polyimide casing with the positive and negative battery terminals extending from the respective anodes and cathodes through the polyimide casing.

In constructing the lithium battery of the present invention, a one-way vent tube is also provided extending from the sealed battery to permit outgassing of the hydrocarbons from therein, for a period of twenty-four hours before being sealed. The battery assembly may be formed in virtually any geometric configuration, and does not require a specific polyimide to function. Polyimides suitable for practice of the present invention include, but are not limited to, the NASA developed polyimides LaRC™-IA (U.S. Pat. No. 5,147,966; LaRC™-ITPI (U.S. Pat. No. 4,937,317); LaRC™-TPI (U.S. Pat. No. 4,094,862); Ciba-Geigy XU series polyimides, Upilex-R (Ube Industries) and Ultem (General Electric).

Variations include deposition of cathode material on copper-coated Kapton® (a DuPont polyimide) or single-sided printed circuit boards. Aluminum foil may also be employed as a conductor for the anode in lieu of the NiAl expanded metal, with similar success.

BRIEF DESCRIPTION OF THE DRAWINGS

A more complete appreciation of the invention and many of the attendant advantages thereof will be better understood when considered in connection with the accompanying drawings wherein.

DETAILED DESCRIPTION

Figure 1:
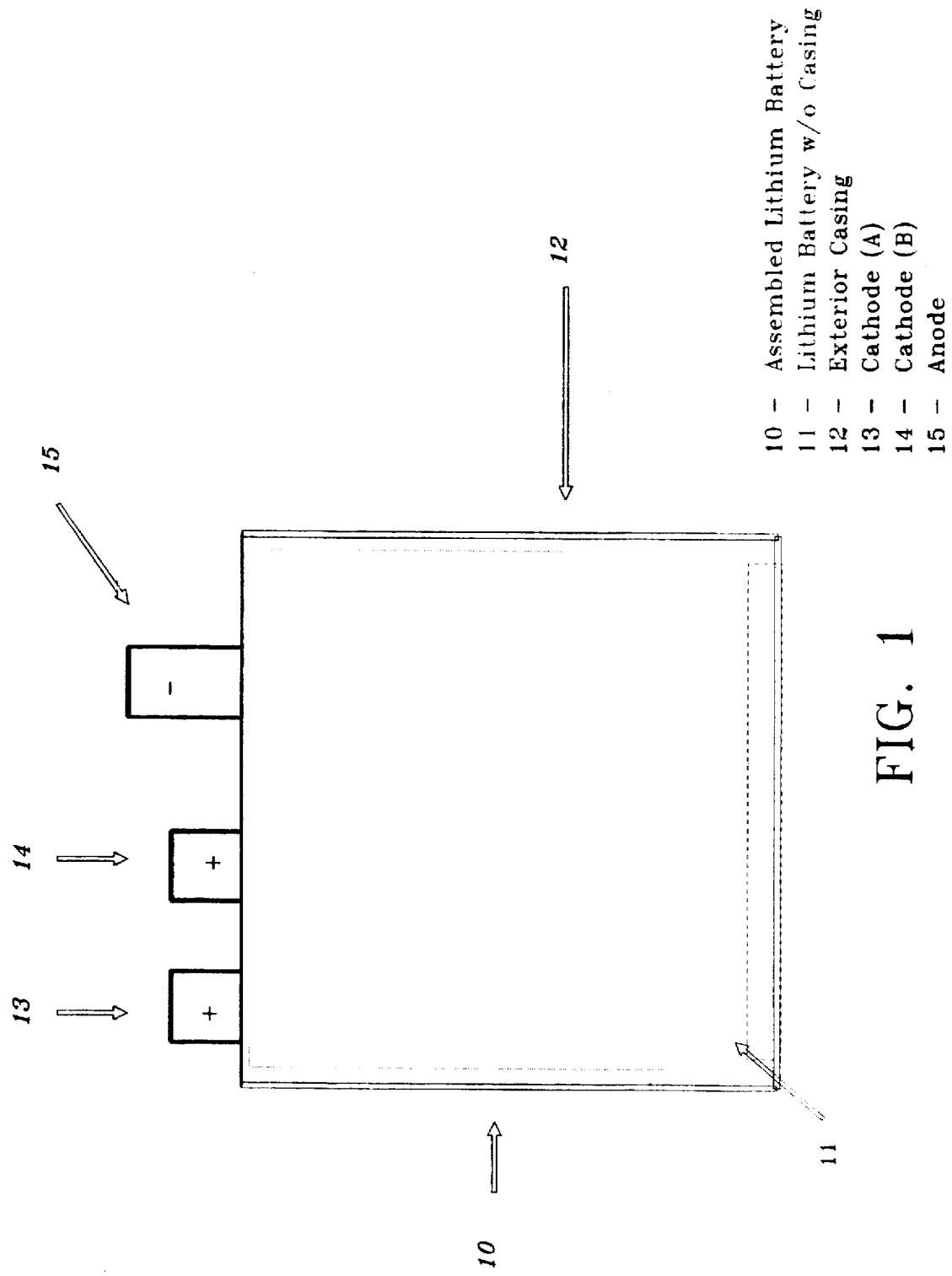
FIG. 1 is a part schematic view of a one embodiment of a cylindrical lithium foil battery according to the present invention.

Referring now to the drawings, and more particularly to FIG. 1, an exemplary lithium-foil battery according to the present invention is schematically shown and designated generally by reference numeral 10. Battery 10 is formed of an internal battery structure 11 enclosed within a sealed casing 12 having two positive (cathode) terminals, designated by reference numerals 13,14 and one negative (anode) terminal, designated by reference numeral 15, extending therefrom. Casing 12, in the preferred embodiment of the present invention, is a suitable molded polyimide or polyethylene glycol. The polyimide LaRC™-IA in solid and gel states, was used in the casing and cell separator, respectively, in this specific embodiment. The lithium-polyimide electrolyte matrix (90% Li/9% NMP/1% polyimide dissolved at 200° F. for three hours) is utilized within this embodiment of the present invention as an ionic reversibility facilitator within the cell. This electrolyte matrix also helps to inhibit charged-state voltage loss, while allowing a certain amount of control over in-service discharge current.

Figure 2:
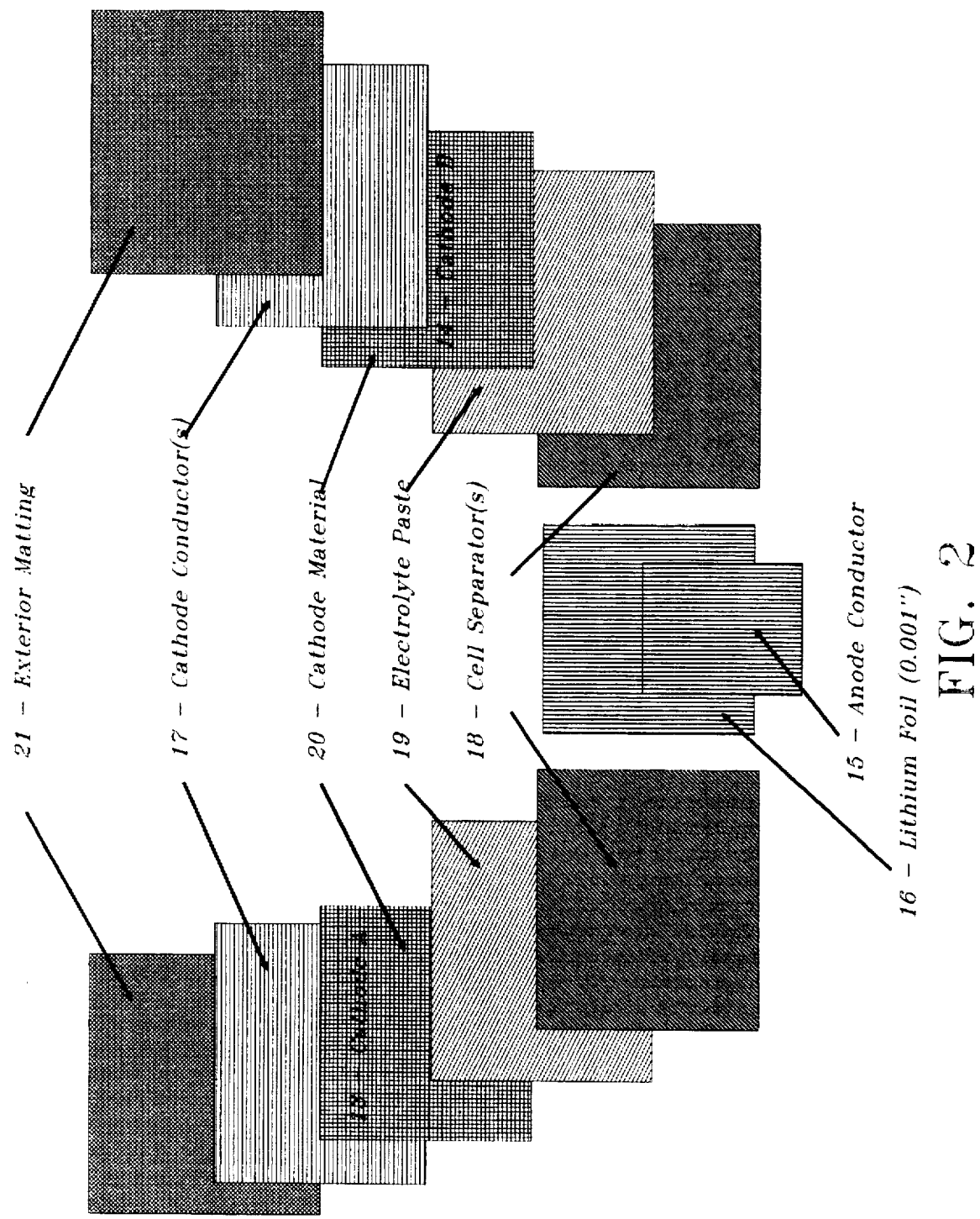
FIG. 2 is an exploded, part schematic, view of the interior structure of the components parts of a rectangular battery according to the present invention.

Referring to FIG. 2, the assembly of the component parts of the inner portion of a rectangular battery, according to the present invention, is illustrated. As shown therein, two layers of the cathode component, formed of cathode conductor layers (aluminum foil, NiAl expanded metal or copper clad plastics foil) designated by reference numeral 17, are employed. Each of the cathode layers 17 supports a cathode material 20 (designated as "cathode A" and "cathode B"). Each cathode layer is provided with an electrolyte gel or paste coating 19 evenly spread on the surface thereof disposed adjacent an anode layer formed of lithium foil 16 and anode conductor foil 15, as will be further explained hereinafter. A cell separator layer 18 is also disposed between the electrolyte layer 19 and the anode, as will also be further explained hereinafter. Each of the cathode conductor layers 17 is also provided with a non-conducting matting layer 21 disposed on the side thereof opposite to that supporting the cathode material 20. The two cathode assemblies are employed to sandwich the anode layer 21 assembly (lithium foil 16 and anode conductor layer 15) therebetween. When assembled, the component parts illustrated in FIG. 2 are pressed together and provided with a suitable molded polyimide casing (not illustrated) and sealed therein, as further explained hereinafter.

Figure 3:
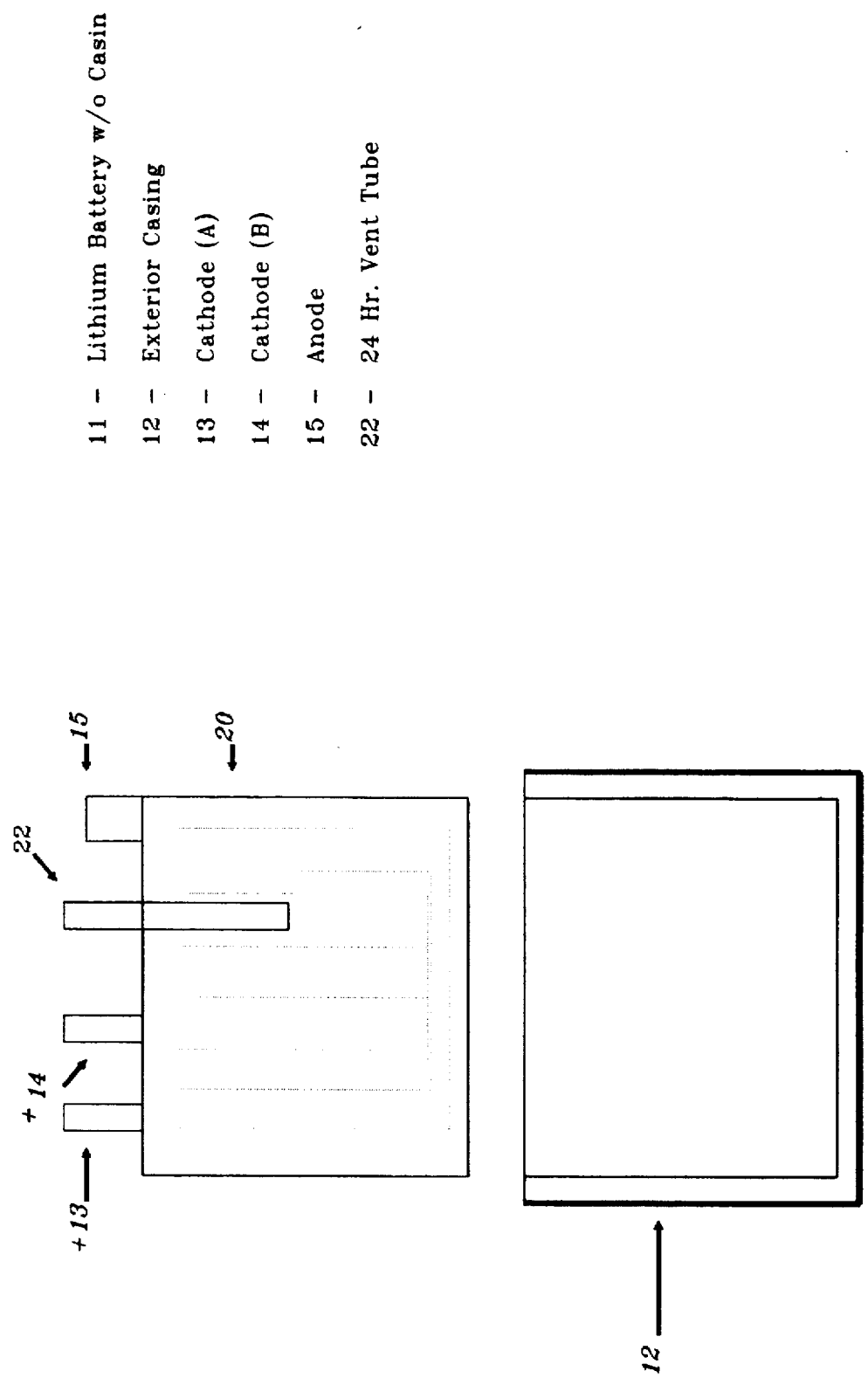
FIG. 3 is a schematic view of the interior battery structure shown in FIG. 1 being placed into an exterior housing therefor.
Figure 4:
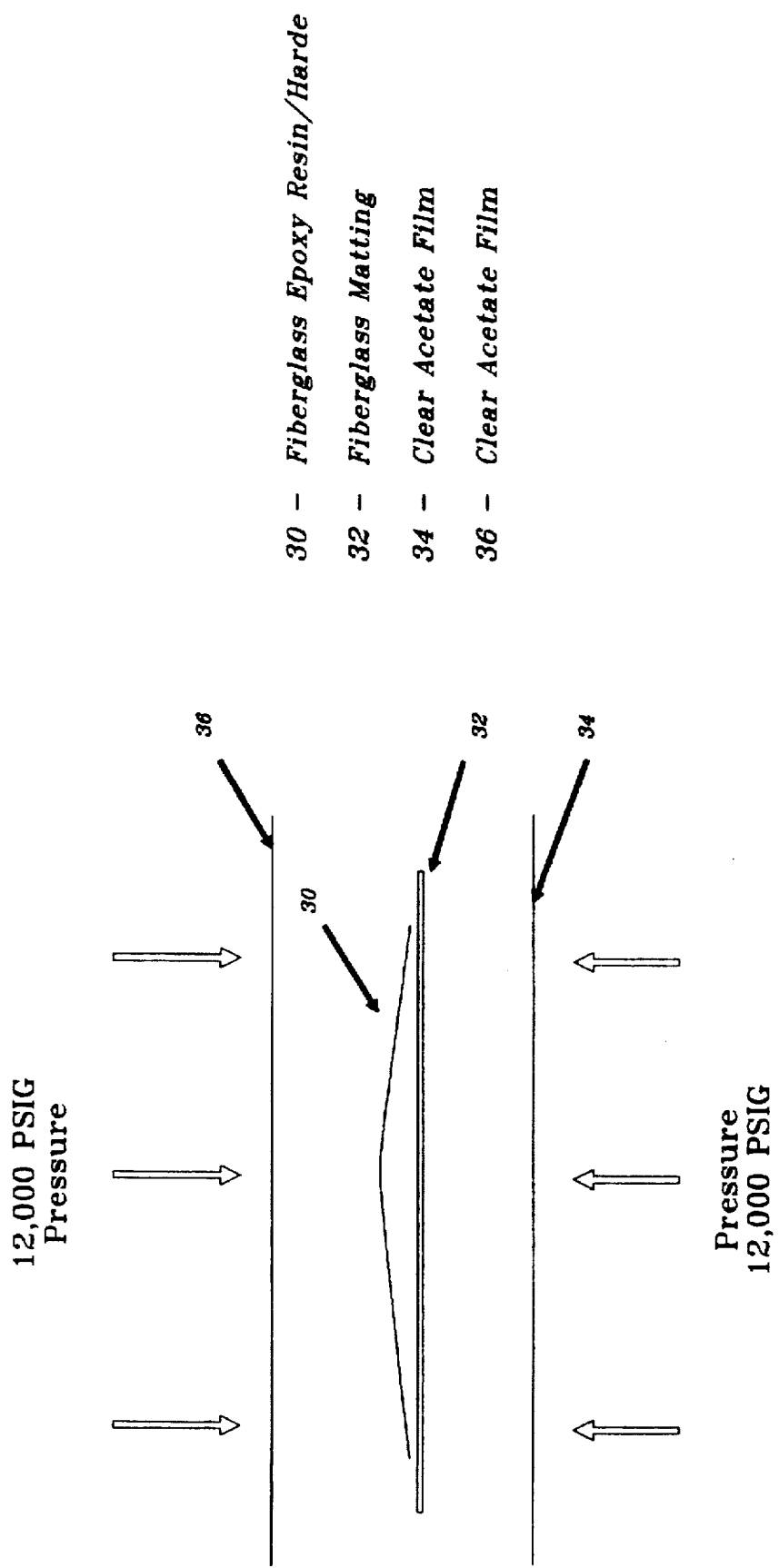
FIG. 4 is a schematic view of the materials and the sequence of events in preparation of the non-conducting matting employed in the battery of the present invention.
Figure 5:
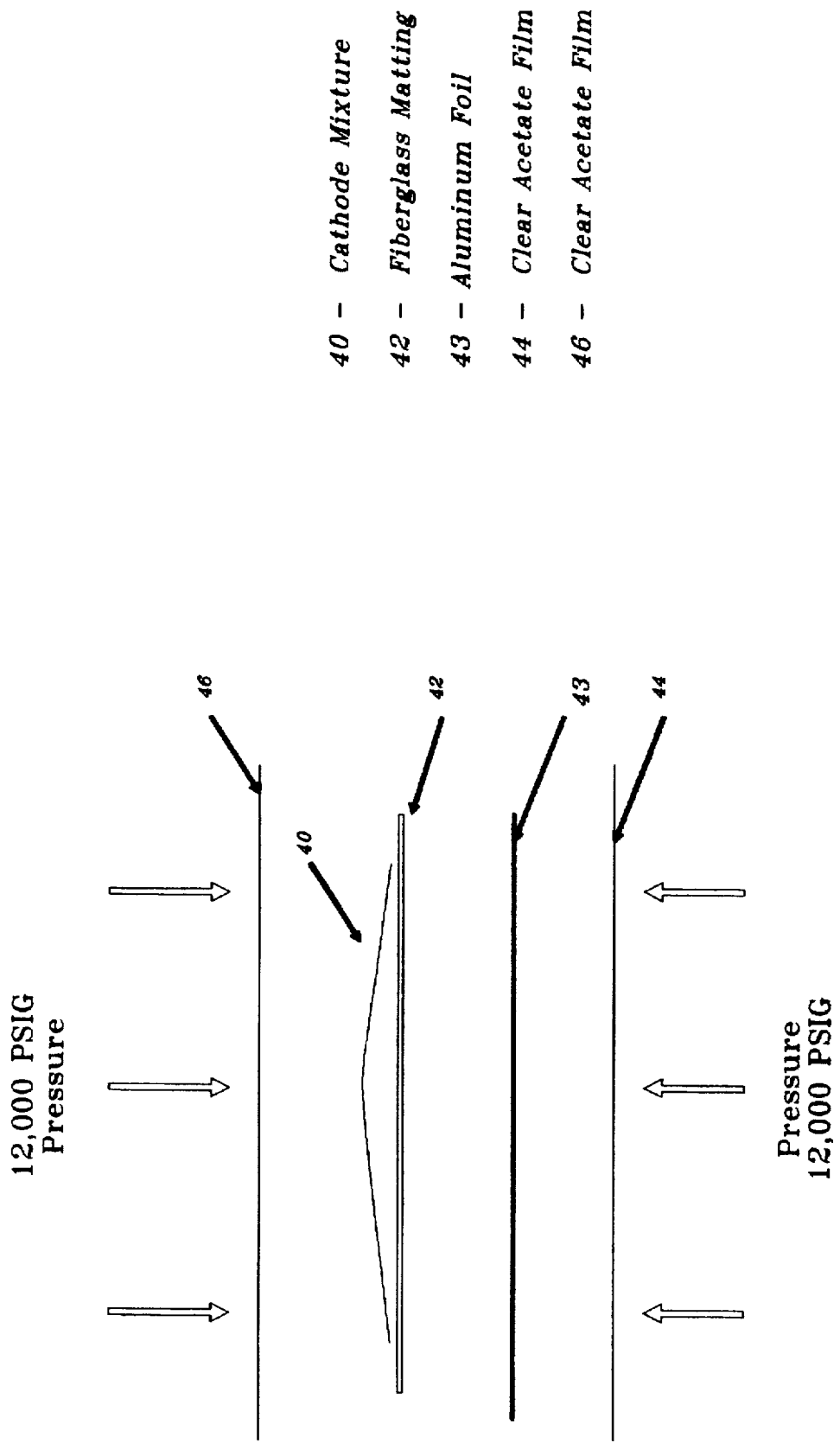
FIG. 5 is a schematic view of the materials and the sequence of events in preparation of the cathode matting assembly employed in the present invention.
Figure 6:
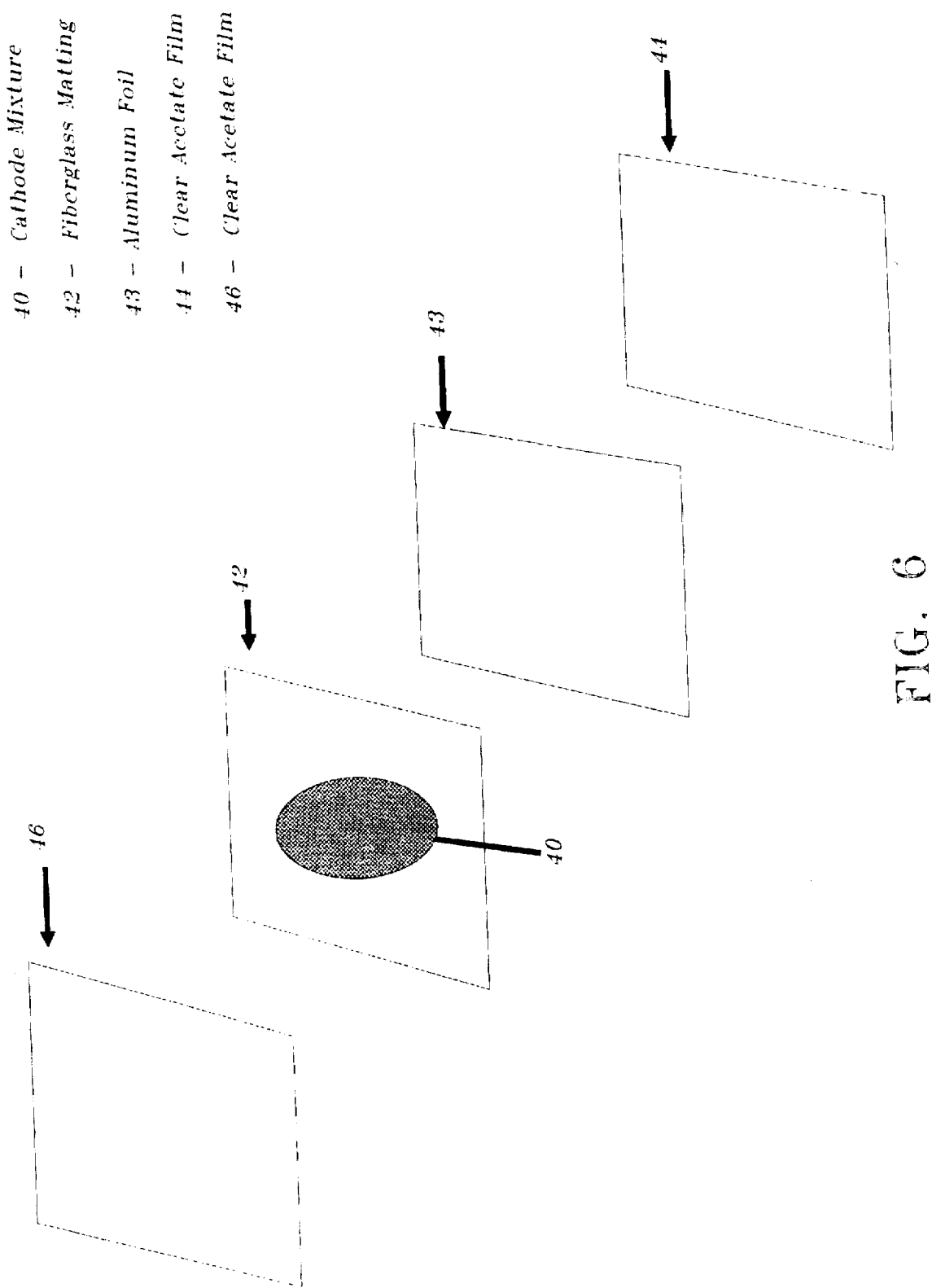
FIG. 6 is a schematic, exploded, perspective view of the cathode assembly components shown in FIG. 5.

Referring to FIG. 3, unitary structure 11 is provided with a vent tube 22 embedded therein and extending therefrom, as will be further explained hereinafter. Unitary structure 11 is placed in a pre-molded plastics casing 12 and sealed therein, as will also be further explained hereinafter.

FIGS. 4-12 illustrate the materials and process steps involved in making radial battery 10. These materials and process steps are essentially identical when employed to make batteries having oval and rectangular configurations.

SPECIFIC EXAMPLES

A. Preparation of the non-conductive matting for battery 10 involves:

(1) cutting two 7 inch by 7 inch sheets of fiberglass matting having a thickness of approximately 5 mils (0.005").

(2) thoroughly mixing one (1) ounce of fiberglass resin with sixteen 16 drops of methylethylketone peroxide (MEKP) hardener with two (2) grams of a polyimide powder.

(3) this mixture (denoted by reference numeral 30, FIG. 4) is evenly poured onto one of the sheets of fiberglass matting 32 that is positioned onto a sheet of clear acetate film 34. The clear acetate film has a thickness of approximately 5 mils.

(4) an additional sheet of clear acetate film 36 is added to the dorsal exposed surface of the matting/resin/hardener/polyimide 30 and the resulting article is pressed in a lab press (FIG. 4) at 12,000 PSIG for a period of three hours at room temperature. PSIG refers to "pounds per square inch gauge".

(5) the pressed, and now dry, article is removed from the press, the acetate films 34,36 are removed and the article is sanded flat using 400 grit sandpaper.

(6) an additional quantity of the resin/hardener/polyimide mixture 30 is prepared as in step A(2) above, and steps (3-5) repeated, except for the final sanding.

B. Preparation of the Cathode matting for construction of battery 10:

(1) mix 14 grams of powdered graphite (5-25 micron mean diameter) with 0.5 grams polyimide powder; 1 gram titanium nitride (TiN); 0.5 grams selenium (Se); 0.5 grams silicon (Si); and 1 gram of Buckminsterfullerene Precursor Powder having a 2-5 micron mean-particle size and containing 2-20% by volume $C_{60}$[4] and >80% carbon soot ($C_2$[4]).

(2) the mixture from step B(1) is added to a one ounce mixture of fiberglass epoxy resin and 16 drops of MEKP hardener; and mixed thoroughly for 5 minutes to form the cathode material.

(3) the mixture from step B(2), as designated by reference numeral 40 (FIGS. 5 and 6) is immediately poured evenly onto the second 7 inch by 7 inch sheet of fiberglass matting 42 obtained from step A(1) above. The resulting article is quickly placed onto an approximately 3 mil thickness film of aluminum foil 43 and positioned between two sheets of clear acetate film 44,46 and pressed at 12,000 PSIG for three and one-half hours in a lab press.

(4) the pressed article is removed from the lab press, acetate films 44,46 are removed, and excess moisture removed by wiping with a paper towel. The remaining article is then permitted to dry at room temperature for at least 30 minutes before further use.

C. Preparation of the Cathode Conductor for battery 10:

(1) two NiAl expanded metal, or two aluminum plates 3-5 mil (0.003"-0.005") thickness are cut to the desired size and shape depending on the available cathode area and the overall geometric shape. In all cases the objective is to obtain the maximum reactive surface area for all reactants, hence the use of the NiAl expanded metal as a cathode conductor and, as will be further explained hereinafter, fiberglass matting strands within the anode and cathode(s). Regardless of the overall configuration, consideration should be given to the desired discharge capacitance, then calculate the conductive surface area required to conduct this discharge current. Empirically, this is approximately 15 squares per linear inch of NiAl expanded metal for maximum discharge current. When aluminum foil is used for preparation of the conductor, perforations are made through the foil in various geometric patterns to increase the overall reactive surface area for the cathode or anode conductors being constructed.

Figure 7:
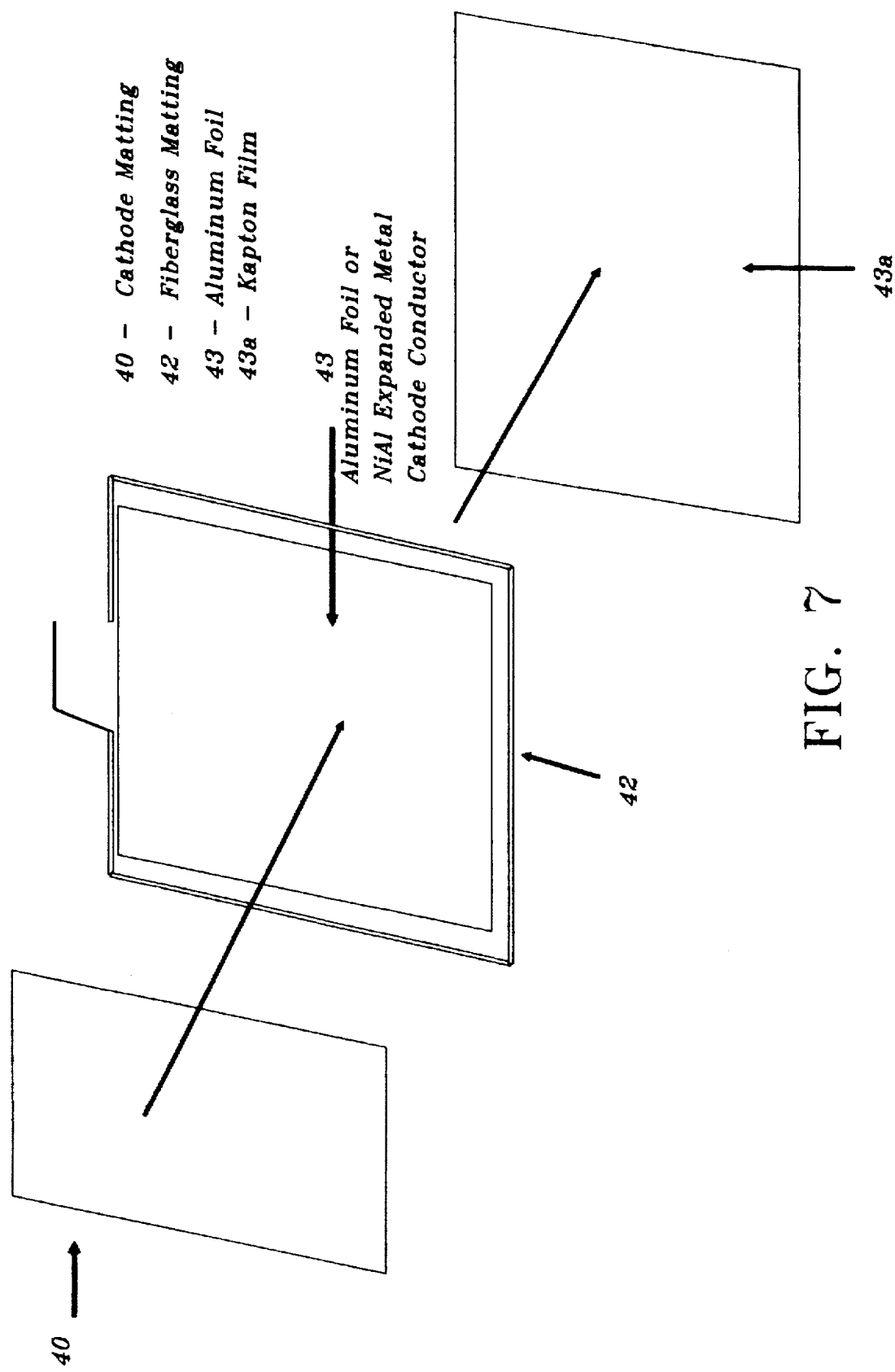
FIG. 7 is a schematic view of one of the cathode strips disposed on aluminum foil (or NiAl expanded metal), as obtained from the procedure illustrated in FIGS. 5 and 6 and as employed in constructing a rectangular battery according to the present invention.
Figure 8:
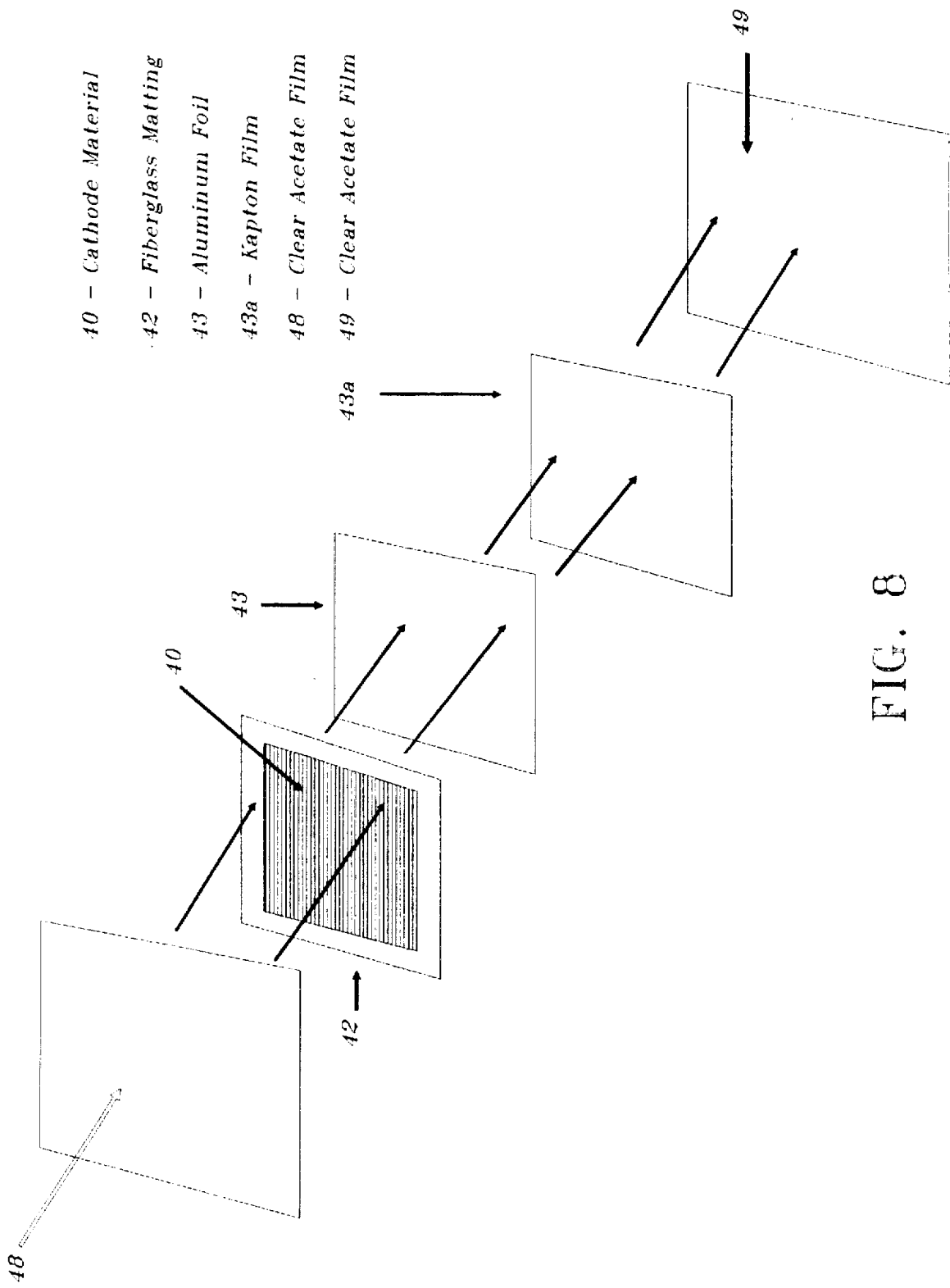
FIG. 8 is a schematic, exploded, perspective view of the cathode material and aluminum foil (or NiAl expanded metal), shown in FIG. 7 being positioned onto a fiberglass matting.

(2) two identical cathode strips are cut from the cathode material matting on the aluminum foil obtained in B(4) to the appropriate size and shape. One of these strips is shown in FIG. 7. As shown therein, one side of the cathode strip is formed of non-conducting fiberglass matting 42, while the other side has aluminum foil 43 extending beyond the boundary edge surfaces of the cathode material 40. This will later become an integral part of the composite battery, performing the secondary duty of an amorphous shim. When the assembled battery 10 is pressed (optimized) for internal resistance, the shimming action of the layers of the composite thin-film battery allows design and mechanical flexibility with improved discharge characteristics, and less cell short-circuit problems.

(3) the cathode strips are heated at 200° F. for sixty (60) to ninety (90) minutes to remove any remaining mechanical moisture, and the cathode strips are then immersed in N-methyl-2-pyrrolidone (NMP) and contained within a sealed flask for 24 hours at room temperature.

(4) the aluminum foil (or NiAl expanded metal) plates 43 are then placed onto the cathode material strips 40, disposed between two cut-out sheets of clear acetate film, 48,49 (FIG. 8) and pressed at 16,000 PSIG in a lab press for twenty (20) minutes.

(5) any remaining mechanical moisture is removed by further heating at 270° F. for 30 minutes and the dried articles immediately bonded to opposite sides of the lithium anode, using J-B Weld or freshly mixed fiberglass epoxy resin/hardener mixture previously prepared, and as further described hereinafter.

Figure 9:
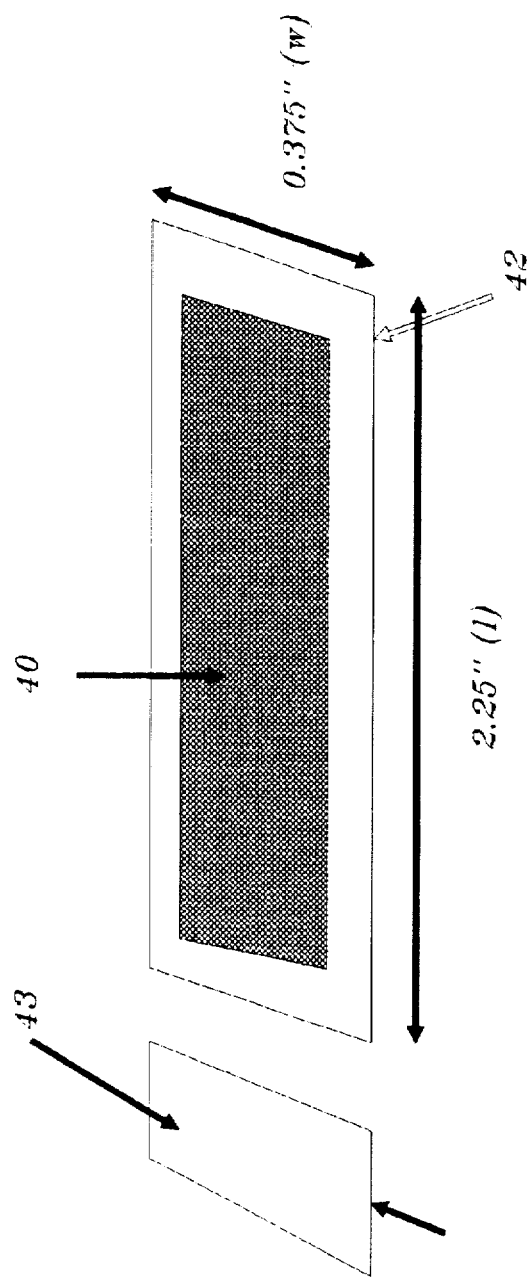
FIG. 9 is a view of the aluminum plate (or expanded metal plate) and cathode material strips similar to that illustrated in FIGS. 7 and 8 as employed in constructing a radial battery according to the present invention.

The cathode material 40 and aluminum foil 43 configuration for a radial battery 10 is illustrated in FIG. 9.

Figure 10:
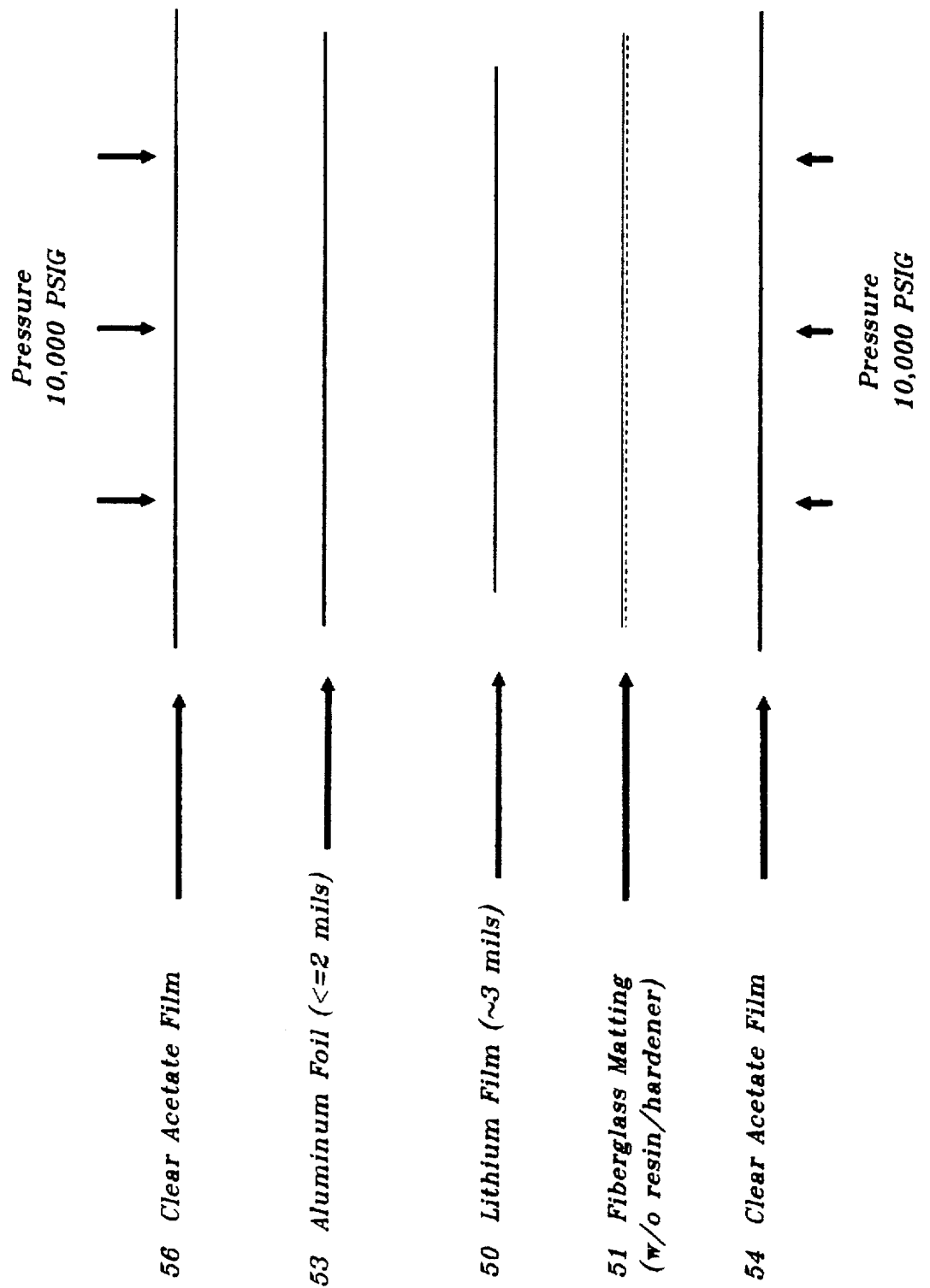
FIG. 10 is a schematic view of the materials and sequence of events in the preparation of the anode assembly employed in the battery of the present invention.

D. Preparation of the anode assembly for battery 10 is schematically illustrated in FIG. 10 wherein:

(1) components include (a) a layer of lithium (Li) film 50 of approximately 3 mils (overall dimensions in a specific embodiment are 0.003" D×0.5"W×2.0"L); (b) a strip of untreated fiberglass matting 51 of the appropriate configuration (typically 2.5"L×0.75"W× 0.003"D); (c) an anode conductor layer 53, formed of nickel/aluminum (NlAl) expanded metal, aluminum foil<=2 mils thickness, or copper coated Kapton® film (72,73 in FIG. 12) of approximately 2 mils thickness, and trimmed to the calculated dimensions for the geometric configuration being constructed, and (d) a layer of a commercial polyolefin material, Cel-Guard® or suitable very thin polyimide film (0.0005" or 0.5 mil), which acts as an anode/cathode separator, and inhibits and restricts dendritic growth in lithium to a very finite area. It should be noted that all anode operations should be carried out in an inert, very low moisture environment for maximum capacity, since lithium is hygroscopic.

(2) The lithium film 50 is placed on the fiberglass matting 51 and wrapped around the anode conductor layer 53; this anode assembly is placed between two layers of clear acetate film 54,56, and pressed in a lab press at 10,000 PSIG pressure for 5–10 minutes; causing the lithium to "flow" into the interstices of the fiberglass matting;

(3) the anode assembly is removed from the lab press, the excess lithium/fiberglass matting is removed, by trimming to the correct configuration, using non-conducting scissors; covered with Cel-Guard® (or very thin film polyimide) and the edges are sealed with cellophane tape so as to encapsulate the lithium/fiberglass matrix.

(4) the anode assembly is dipped in NMP for one minute, removed and placed on a paper towel to remove excess NMP.

(5) The anode assembly is then employed as described hereinbefore relative to step C(5).

E. A polyimide cell-separator sheet is constructed by:

(1) mixing polyimide (LaRC™-IA or similar polyimide) with NMP in a 9:1 ratio for 30 minutes while agitating slowly;

(2) spray a glass sheet (Pyrex®) with cooking oil or similar material to assist the film in being released from the glass sheet;

(3) pour mixture onto glass sheet and heat slowly to 220°F.;

(4) allow sheet to dry on heated glass, rolling the polyimide sheet with a glass tube frequently to flatten it out to a very thin film;

(5) after dry, remove from glass using flat razor blade.

F. The electrolyte used in the present invention is formulated by following these steps:

(1) place 7 grams of lithium and 100 ml. NMP within a 500 ml. Erlenmeyer flask, or similar container;

(2) place approximately 0.25 grams of polyimide powder (LaRC™-IA or similar) in the flask containing the lithium/NMP mixture;

(3) heat slowly to, and maintain temperature at 200° F. for three hours;

(4) remove from heat, cover, and allow to cool to room temperature;

(5) remove flocculate (gel) from bottom of flask, and store appropriately (this is the composite electrolyte);

(6) store remaining lithium/NMP/polyimide bath for later use.

Figure 11:
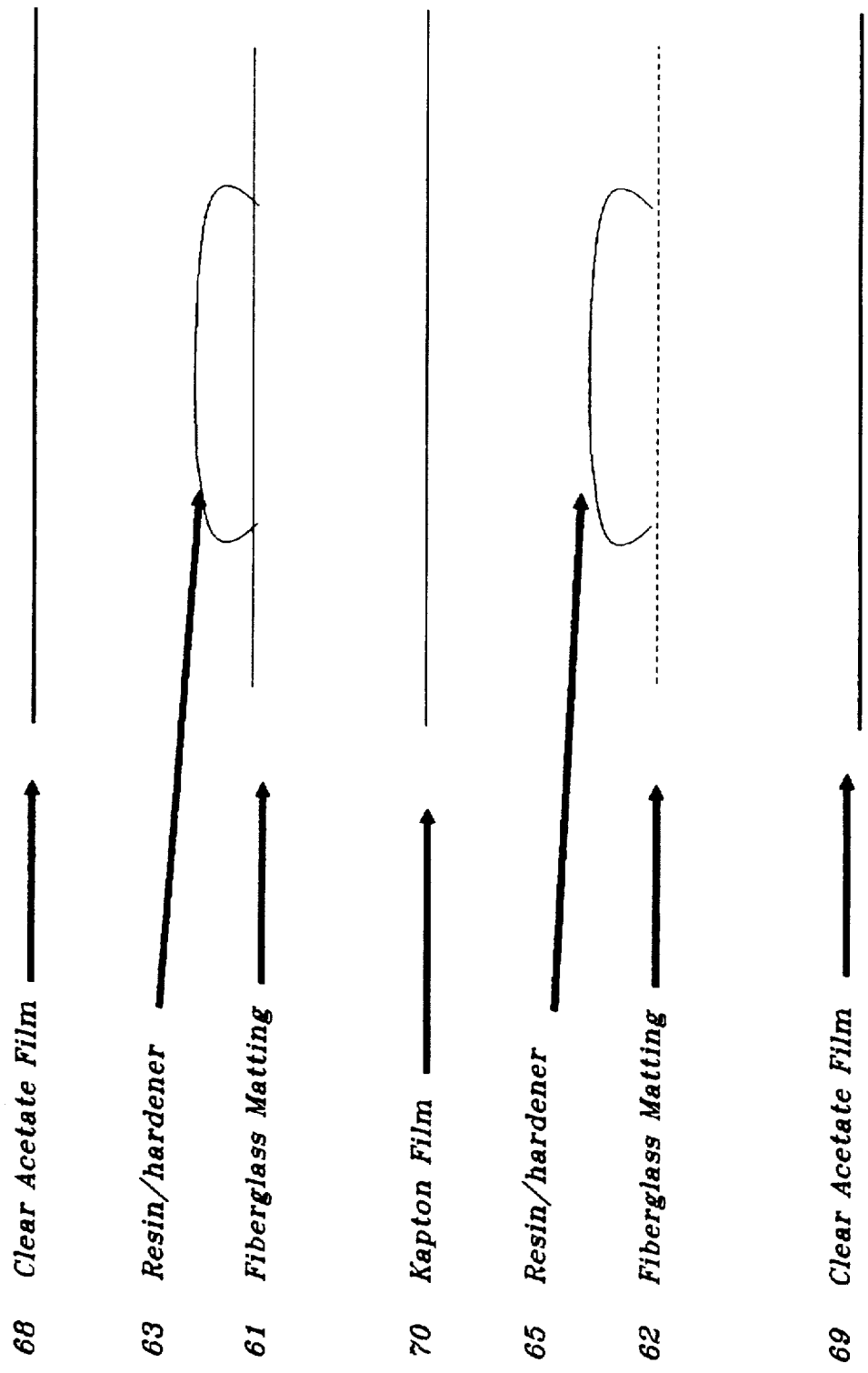
FIG. 11 is a schematic view of the materials and process in preparing an alternate cathode assembly for constructing the battery illustrated in FIG. 3; and, FIG. 12 is a schematic view of an additional alternate cathode assembly for constructing the lithium battery of the present invention.

Referring now more particularly to FIG. 11, preparation of an alternate cathode material assembly for concatenation of the lithium battery of the present invention will now be described. As shown therein, two fiberglass mattings 61 and 62, each having a fiberglass epoxy resin/hardener mixture thereon, as designated respectively by reference numerals 63,65, are provided. The fiberglass epoxy resin/hardener mixtures 63,65 are identical to that described hereinbefore at B(2), and each consists of a mixture ratio of one ounce fiberglass resin and 16 drops hardener, thoroughly mixed for a period of 5 minutes. A suitable plastics material film 70 such, for example, Kapton® (DuPont), is placed between fiberglass mattings 61,62 and this assembly positioned between clear acetate film layers 68,69.

The entire structure is then pressed at 12,000 PSIG for three and one-half hours in a suitable lab press. The pressed article is then removed from the press, wiped dry, and then permitted to further dry at room temperature for at least 30 minutes prior to use in assembly of the lithium battery described hereinbefore.

This cathode assembly modification is specifically designed to inhibit oxygen/moisture exchange between the lithium and the external environment. Smaller, specific designs may be cut out of the cathode sheet as removed from the lab press.

Referring now more particularly to FIG. 12, another modification of the cathode assembly employed in constructing lithium batteries of the present invention will now be described. In this embodiment, the resultant fiberglass/plastics (Kapton®) laminate 71, obtained from the process described in reference to FIG 11, is further processed. A Kapton®, or other suitable plastics material, film 72 is provided with a copper clad coating 73 (approximately one (1) mil thickness) on one surface thereof. Kaptone® is a tradename plastics product available directly from DuPont.

A quantity of fiberglass resin/hardener 74 (as described hereinbefore in reference to the embodiment of FIG. 11) is positioned on the un-coated plastics film surface 72 and disposed adjacent the laminate 71 obtained in the process described in reference to FIG. 11. This assembly is then pressed together, between two sheets of clear acetate film 68,69, in a lab press at 10,000 PSIG for three hours.

The pressed article is then removed from the lab press, wiped dry, and then permitted to dry at room temperature for at least thirty minutes before further processing in the assembly of the lithium battery, as described hereinbefore.

This cathode assembly is particularly designed to further isolate the internal lithium, to produce a laminar surface for adhesion, and to serve as the cathode conductor without causing electrical shorts in the cell. Precautions must be taken (by using Cel-Guard®, very thin film LaRC™-IA, or other polyimide coating or films) however, to prevent shorting under pressure, super-critical off-gassing and/or delaminations. In the present invention, over pressurization and off-gassing are controlled to the extent possible by use of vent tube 22 (FIG. 3). The term "super-critical off-gassing" refers to high pressure gasses given off when a battery exceeds its usable environmental criteria, usually temperature or pressure. Delamination, as used herein, refers to forced physical separation of layers of materials that are bound by an intermediary bonding agent during lamination where several thin layers are bonded into one coherent unit.

Because of the design and mechanical flexibility of the cathode and anode assemblies, most shapes (circular, triangular, trapezoidal, etc.) can be produced using the basic methods described herein. In making the rectangular or radial batteries, care must be taken to limit the incursion/inclusion of NMFP. When sealing batteries of unusual design, vent tubes should be sealed with fiberglass resin/hardener after twenty-four hours.

The preferred embodiment is the radial configuration illustrated in FIGS. 2 and 3. It is important to allow the radial casing 12, cast using the fiberglass resin/hardener and polyimide matrix, to dry at room temperature for 24 to 48 hours before adding the anode/cathode/electrolyte 11 to the casing. In a specific embodiment casing 12 was cast as a solid polyimide article and a ⅛ inch drill bit used to bore the internal diameter therein, being careful of the wall thickness consistency.

Assembly 11 is dipped in fresh NMP, then lightly dried using paper towels or similar absorbent material just prior to insertion into casing 12. Care must be taken to rapidly assemble the components to reduce lithium oxidation and absorption of atmospheric water into the NMP and lithium, as they are hygroscopic. After battery assembly, an exterior casing of polyimide (LaRC™-IA or similar polyimide) is cast about the finished battery to permit use in extreme environments.

Although the polyimide LaRC™-IA was used in the specific examples described herein, the invention is not so limited and other of the La RC™ series of polyimides, described hereinbefore, as well as other suitable polyimides, are useful in practice of the present invention in making the electrolyte, cell separators and to increase the internal resistance of the battery cell. These additional include the commercially available Ciba-Geigy XU series polyimides, Upilex-R, and Ultem (General Electric).

As described hereinbefore in Step B(1) regarding preparation of the cathode matting, the precursor employed in the specific embodiment of the present invention is Buckminsterfullerene Precursor Powder which contains 2% to 20% (by volume) or $C_{60}{}^4$ "Buckminsterfullerenes". The preponderance (>80%) of the Precursor Powder contains simple Carbon soot, or $C_2{}^4$. Buckminsterfullerene Precursor Powder is available from Alfa-Aesar, 30 Bond street, Ward Hill, Mass. 01835, and other chemical supply vendors.

Buckminsterfullerenes are formed by using a carbon or graphite rod as the electrode in an arc welding machine, utilizing the very-high temperature arc created upon grounding to bond simple carbon molecules together into a very complex, soccer-ball shaped, large diameter carbon molecule.

In operation, these "Buckeyballs" facilitate recharging by acting as an electronic gate that allows ions to pass freely through the molecule system in either direction, but allows only one pathway for charging and another for recharging.

In performing this ordering chore, several beneficial effects are anticipated and include: (a) cell shorting due to dendritic growth is virtually eliminated by the use of "Buckeyballs" as an anode/cathode intermediary, acting as an ion conductor/gate; (b) while in operation, the lithium will form coherent charge/discharge highways within the interstices of the "Buckeyballs" that provides stable, linear charge/discharge patterns; and (c) the quality of reversibility (rechargability) and the power output should increase during the first few months of use, then stabilizing at the average power input during recharging.

These beneficial results anticipated are believed achieved because more fresh lithium from the anode is introduced to the cathode constituents via the electrolyte during charge/recharge cycling, hence a modest increase in power output should be noted after each of the first fifty to seventy-five recharges.

Empirical data confirming this property in a specific embodiment 6V/5AHr/33 gram battery, prepared as described hereinbefore, found that after twenty minutes, the power output increased by approximately 0.3 Volts (approximately 6%) and sustained that output for about 65 minutes. Other relevant information of "Buckeyballs" is found at page 39 of the February 1997 issue of *Scientific American* and in the May 1988 issue of *Popular Science*.

The expressions "cut to the desired size" and "cut to the appropriate size and shape" as used herein are intended to express and convey the intention of cutting mattings, conductors, and reactant materials to a shape such that, when assembled, the battery will occupy the exact space laid out in the design specifications for the battery to occupy.

The Hoechst-Celenese polyolefin "Cel-Guard®" (an ionic conductive polymer), employed in the specific examples described hereinbefore, is a gas-semipermeable, ion-permeable, liquid-semi-permeable material available in very thin (<0.0005") sheets. This material helps protect the lithium from being contaminated by external sources, inhibits dendritic growth, prevents internal cell-shorting by anode/cathode conductor contact, and can restrict the amount of electrolyte that comes in contact with the anode material or the cathode material. Cel-Guard® is an excellent ion conductor, and is capable of maintaining internal resistances as low as 0.005 Ohms.

Although the invention has been described herein relative to specific materials, examples and embodiments, it is not so limited. There are numerous variations and modifications of the invention that will be readily apparent to those skilled in the art to which it pertains in the light of the above teachings.

It is therefore to be understood that, within the scope of the appended Claims, the invention may be practiced other than as specifically described herein.

What is claimed as new and desired to be secured by Letters Patent of the United States is:

1. A thin film lithium battery comprising:

a lithium anode assembly;

a cathode assembly;

a metal film supporting said cathode assembly;

said lithium anode and said metal film supporting said cathode assembly being disposed in alternate layers;

a composite electrolyte in gel form contacting the alternate layers of said lithium anode assembly and said metal film supporting said cathode assembly;

said electrolyte including a quantity of lithium and N-methyl-2-pyrrollidone contained within a polyimide matrix; and a sealed polyimide casing containing the alternate layers of said lithium anode assembly and said metal film supporting said cathode assembly.

2. The lithium battery of claim 1 including separate electrical contacts for each of said lithium anode assembly and said metal supported cathode assembly;

said electrical contacts extending to the exterior of said sealed polyimide casing.

3. The lithium battery of claim 1 including an out-gassing vent tube extending from said sealed polyimide casing, said out-gassing vent tube being open when said lithium battery is first constructed and sealed within 24 hours after battery assembly.

4. The lithium battery of claim 1 wherein said metal film supporting said cathode assembly is selected from the group of metal films consisting of (a) an NiAl expanded metal, (b) aluminum foil, and a copper clad plastics.

5. A method of making a lithium battery comprising the steps of:

(a) providing a gel electrolyte by dissolution of lithium in an N-methyl-2-pyrrollidone/polyimide matrix;

(b) providing a non-conductive matting including a first sheet of fiberglass material having a mixture consisting of fiberglass resin and resin hardener and a polyimide powder press dried thereon;

(c) providing a lithium anode assembly including at least one layer of a lithium film and an anode conductor layer;

(d) providing a second sheet of fiberglass material disposed on a metal film selected from the group of metal films consisting of (i) an aluminum foil sheet, (ii) a NiAl expanded metal foil, and (iii) a copper clad plastics film;

(e) press drying a cathode material mixture onto the metal film from step (d) to form a cathode material matting;

(f) cutting two identical strips from the cathode material matting obtained in step (e) and placing each strip between a pair of aluminum plates;

(g) press bonding each of the strips of cathode material matting to the aluminum plates disposed thereon in a lab press at 16,000 PSI for twenty minutes;

(h) spreading a lithium/NMP/polyimide gel onto the cathode material matting;

(i) sandwiching and bonding the anode assembly obtained in step (c) between the aluminum plates containing the cathode material obtained in step (f);

(j) covering the article obtained in step (i) with a layer of the non-conductive matting provided in step (b);

(k) wrapping or spooling the non-conductive matting and bonded anode and cathode materials into a radial configuration;

(l) inserting the radial configuration into an open casing formed of a fiberglass/hardener mixture; and (m) sealing the open fiberglass resin/hardener casing with an exterior coating of a polyimide to produce a finished lithium battery.

6. The method of claim 5 wherein the mixture of fiberglass resin and resin hardener and polyimide powder includes a mixture ratio of one ounce of fiberglass epoxy resin and 16 drops of methylethylketone peroxide hardener with two grams of a polyimide powder.

7. The method of claim 6 wherein the first sheet of fiberglass material consists of a fiberglass matting of approximately five mils thickness and wherein the mixture of resin and resin hardener and polyimide powder is evenly distributed thereon.

8. The method of claim 7 wherein the fiberglass matting having the evenly distributed mixture thereon is placed between two sheets of clear acetate film, each having a thickness of approximately five mils, and pressed in a lab press at room temperature and at approximately 12,000 PSIG for a period of approximately three hours.

9. The method of claim 8 including the steps of:

sanding flat the recovered pressed non-conducting matting article using 400 grit sandpaper;

applying an additional quantity of the fiberglass resin, resin hardener and polyimide powder evenly distributed over the flat sanded matting article;

again placing the coated matting article between two sheets of clear acetate film and pressing again at approximately 12,000 PSIG in a lab press for an additional three and one/half hours; and removing the pressed article from the lab press to recover a finished non-conductive matting for use in preparation of the lithium battery.

10. The method of claim 5 wherein the lithium film in the lithium anode assembly has a thickness of approximately 3 mils and including the step of providing a fiberglass matting supporting the lithium film.

11. The method of claim 10 including:

providing an anode conductor layer selected from the group of conductor layers consisting of (i) a layer of copper coated plastics (ii) a layer of nickel/aluminum expanded metal having a thickness of approximately 2 mils;

wrapping the fiberglass supported lithium film around the conductor layer to form an anode assembly;

placing the anode assembly between two layers of clear acetate film and pressing the anode assembly at 10,000 PSIG in a lab press for five–ten minutes;

removing the pressed anode assembly from the press and trimming the anode assembly pressed article to the desired configuration; and wrapping the pressed anode assembly in a moisture proof wrapping until ready for use in making the lithium battery.

12. The method of claim 5 wherein the cathode material mixture includes:

(a) a mixture ratio of 14 grams of powdered graphite, 0.5 grams polyimide powder; 1 gram titanium nitride; 0.5 grams silicon; and 1 gram carbon precursor powder; and (b) a mixture ratio of one ounce fiberglass resin and 16 drops methylethylketone peroxide hardener;

thoroughly agitating the mixture obtained in step (a) with that of step (b) for a period of at least 5 minutes to recover the cathode material mixture.

13. The method of claim 12 wherein said carbon precursor powder has a mean particle size of 2–5 microns and contains 2–20%, by volume, $C_{60}^4$ and >80%, by volume $C_2^4$ carbon soot.

14. The method of claim 12 including:

pouring the cathode material mixture onto a sheet of fiberglass matting;

placing the fiberglass matting onto a metal film selected from the group of metal films consisting of (i) aluminum foil and (ii) nickel/aluminum expanded metal;

positioning the resulting article between two sheets of clear acetate film;

pressing the acetate film contents in a lab press at approximately 12,000 PSIG for three and one half hours;

removing the pressed article from the lab press;

removing the acetate films from the pressed article;

wiping excess moisture from the pressed article with paper towels; and permitting the wiped article it to further dry at room temperature for at least 30 minutes prior to use.

15. The method of claim 14 including:

heating each of the two identical strips of cathode material to approximately 200° F. for sixty to ninety minutes to remove any remaining mechanical moisture;

permitting the heated strips to cool to room temperature;

immersing the room temperature cooled strips of cathode material matting in a container of N-methyl-2-pyrrollidone and sealing the container and contents for a period of at least 24 hours.

16. The method of claim 15 including:

removing the two strips of cathode material matting from the container of N-methyl-2-pyrrollidone and inserting the strips into separate aluminum foil plates previously provided with cut-out portions to accept the cathode material strips;

placing each of the aluminum foil plates containing the cathode material matting between two sheets of clear acetate film and pressing the resultant at 16,000 PSIG in a lab press for twenty minutes prior to employing the pressed aluminum plates and cathode matting to sandwich and bond the anode assembly therebetween.

* * * * *